(12) United States Patent
Ledet

(10) Patent No.: US 10,481,904 B1
(45) Date of Patent: Nov. 19, 2019

(54) COMMENT DATA INTERACTION AND UPDATING AMONG INPUT DATA RECEIVED FOR A SHARED APPLICATION

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 27 days.

(21) Appl. No.: 15/181,711

(22) Filed: Jun. 14, 2016

(51) Int. Cl.
G06F 8/71 (2018.01)
H04L 29/08 (2006.01)
G06Q 10/10 (2012.01)
H04L 12/58 (2006.01)

(52) U.S. Cl.
CPC ............ *G06F 8/71* (2013.01); *G06Q 10/101* (2013.01); *H04L 51/046* (2013.01); *H04L 67/306* (2013.01)

(58) Field of Classification Search
CPC ... G06F 8/70; G06F 8/20; H04L 51/04; H04L 65/1069; H04L 67/306; H04L 67/42
See application file for complete search history.

(56) References Cited

U.S. PATENT DOCUMENTS

| | | | | |
|---|---|---|---|---|
| 9,442,718 B1* | 9/2016 | Wang | ............ | G06F 8/71 |
| 2005/0005258 A1* | 1/2005 | Bhogal | ............ | G06F 8/73 |
| | | | | 717/102 |
| 2008/0228762 A1* | 9/2008 | Tittizer | ............ | G06F 8/73 |
| 2010/0162209 A1* | 6/2010 | Brown | ............ | G06F 8/73 |
| | | | | 717/110 |
| 2012/0272207 A1* | 10/2012 | Lerner | ............ | G06F 8/71 |
| | | | | 717/102 |

* cited by examiner

*Primary Examiner* — Wei Y Zhen
*Assistant Examiner* — Amir Soltanzadeh

(57) ABSTRACT

Code creation and revision requires optimal error detection and correction and collaboration among programmers. One example method of operation may include receiving and processing a comment associated with a first user profile, identifying a software code context of the comment based on a software code data file, identifying a number of other user profiles associated with the software code context of the comment, and transmitting request messages to the other user profiles to provide feedback regarding the software code context of the comment.

20 Claims, 14 Drawing Sheets

COMMENT DATA INTERACTION AND UPDATING AMONG INPUT DATA RECEIVED FOR A SHARED APPLICATION

TECHNICAL FIELD OF THE APPLICATION

This application relates to customized user information sharing and more specifically to making collaboration among users sharing updates and comments with regard to a developing application.

BACKGROUND OF THE APPLICATION

Conventional user access and network based collaboration on work related projects provide access, security updates and other features to the enterprise environment. One conventional application is offered by LIVELOOK as a provider of cloud-based, real-time visual collaboration with technology for co-browsing and screen sharing that optimizes customer interactions. For example, LIVELOOK's co-browsing technology enables customer service and sales agents to collaborate and visually guide consumers through web and mobile environments to resolve issues effectively and improve quality of buying decisions.

The ORACLE 'Service Cloud' and LIVELOOK empowers modern customer service organizations to directly engage with customers, bolstering customer satisfaction, agent efficiency, and revenue growth across web and mobile channels. The 'Service Cloud' is an integral part of the 'Customer Experience Cloud', which includes commerce, sales, service, social and marketing clouds, and enables a seamless and integrated customer experience. However, such approaches to customer support and integrated collaboration tools are limited in scope and do not offer a fully customized approach to user collaboration and engagement efforts.

In one specific example, software development, especially in an enterprise environment, requires management of large numbers of lines of code. In addition, as projects increase in size, more developers are brought onto the project such that there are many different developers both writing new code and correcting errors (or bugs) in a large code base. Any modifications made to code in a large code base may break other code, as it is often impossible to determine the impact of altering a single variable in the scope of the large code base. As the code base grows, it becomes vital to add comments to the code such that the reader of the code is able to ascertain the logic of the code without having to understand the exact logic of the actual code. In addition, it is just as vital to alter the comments in the code when the logic is altered. Many times, the code is changed and the comments remain unchanged. Therefore, the comments become outdated such that many software developers will not even refer to the comments, as it is widely understood that the comments will most probably be out of sync with the actual logic of the code. It would be optimal to offer additional insight into the software developers' thoughts when either writing code or fixing an error in the code or when making any modification at all to the code or a similar complex source of data.

SUMMARY OF THE APPLICATION

One example embodiment may provide a method that includes at least one of receiving and processing a comment associated with a first user profile, identifying a context of the comment, identifying at least one previously submitted comment with a context that matches the context of the comment, retrieving the at least one previously submitted comment, identifying a second user profile associated with the previously submitted comment, and invoking a communication session and including the first user profile and the second use profile in the communication session.

Another example embodiment may include an apparatus that includes a receiver configured to receive a comment associated with a first user profile, and a processor configured to perform at least one of identify a context of the comment, identify at least one previously submitted comment with a context that matches the context of the comment, retrieve the at least one previously submitted comment, identify a second user profile associated with the previously submitted comment, and invoke a communication session and include the first user profile and the second use profile in the communication session.

Another example embodiment may include a non-transitory computer readable storage medium configured to store instructions that when executed causes a processor to perform at least one of receiving and processing a comment associated with a first user profile, identifying a context of the comment, identifying at least one previously submitted comment with a context that matches the context of the comment, retrieving the at least one previously submitted comment, identifying a second user profile associated with the previously submitted comment, and invoking a communication session and including the first user profile and the second use profile in the communication session.

Yet another example embodiment may include a method that includes at least one of receiving and processing a comment associated with a first user profile, identifying a software code context of the comment based on a software code data file, identifying a plurality of other user profiles associated with the software code context of the comment, and transmitting request messages to the plurality of other user profiles to provide feedback regarding the software code context of the comment.

Still another example embodiment may include an apparatus that includes a receiver configured to receive a comment associated with a first user profile and a processor configured to perform at least one of identify a software code context of the comment based on a software code data file, identify a plurality of other user profiles associated with the software code context of the comment, and a transmitter configured to transmit request messages to the plurality of other user profiles to provide feedback regarding the software code context of the comment.

Yet still another example embodiment may include a non-transitory computer readable storage medium configured to store instructions that when executed causes a processor to perform at least one of receiving and processing a comment associated with a first user profile, identifying a software code context of the comment based on a software code data file, identifying a plurality of other user profiles associated with the software code context of the comment, and transmitting request messages to the plurality of other user profiles to provide feedback regarding the software code context of the comment.

BRIEF DESCRIPTION OF THE DRAWINGS

FIG. 4 illustrates a collaboration user application interface according to an example embodiment of the present application.

FIG. 5 illustrates a comment sharing example of the collaboration user application interface according to an example embodiment of the present application.

FIG. 10 illustrates a comment update interface according to an example embodiment of the present application.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
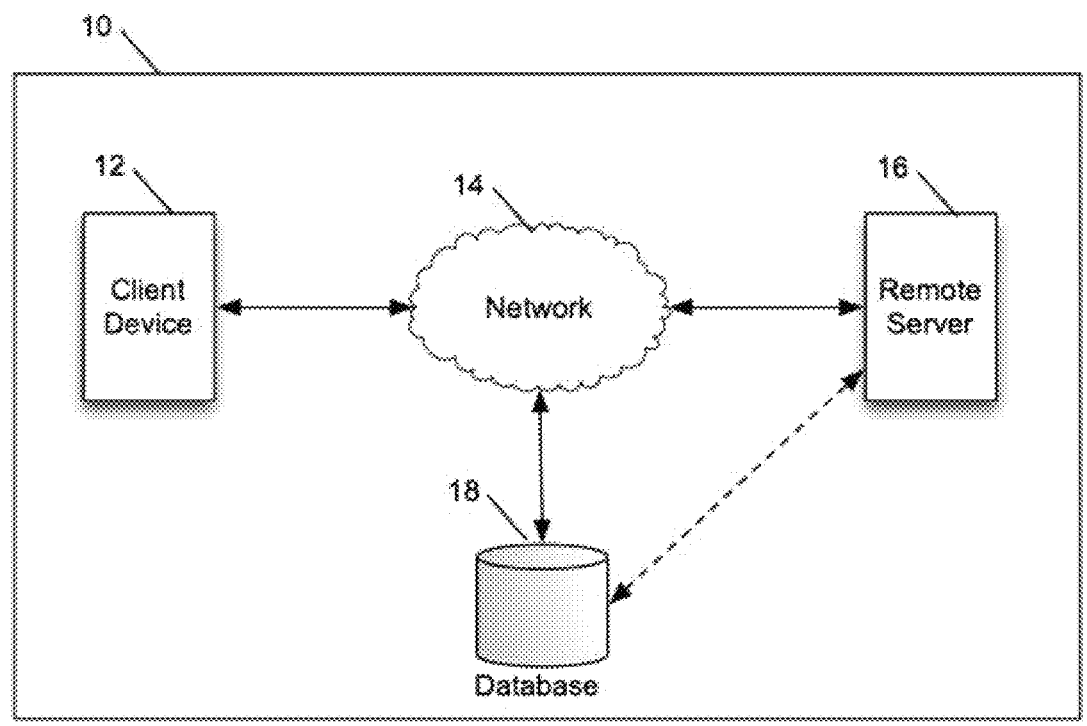
FIG. 1 illustrates a system diagram according to an example embodiment of the present application.

FIG. 1 illustrates a system network diagram according to an example embodiment of the present application. Referring to FIG. 1, the network diagram 10 of the present application may permit a "client device" 12 utilizing any of a mobile client machine, a tablet computer, a laptop or desktop computer to download data and application data from a remote server 16 over the network 14. The client's device may also be a gaming device, a DVD player, or any other device that is normally used to access media.

The client device 12 is connected to the network 16, which may be the Internet or any other type of communication network through wired or wireless communication. It should be noted that other types of devices, in addition to the device 12, might be used with the example embodiments of the present application. For example, a PDA device, an MP3 player device and/or any other wireless device including a gaming device, such as a hand-held device or home-based device and the like including a P.C. or other wired device that can also transmit and receive information could be used with the embodiments of the present application.

The user of the application can interface with the client device 12 and connect through the network 14 to the remote system server 16. The server 16 can be redundant or may be more than a single entity without deviating from the scope of the application. A database or database server 18 may be directly connected to the system server 16 or connected remotely through the network 14 without deviating from the scope of the application.

The application of the current application resides completely or partially on the user's device 12, which can be a mobile device, but can also reside on a user's desktop computer, a personal digital assistant (PDA), tablet computer, a smart watch or smart eyeglass worn on the body of the user or any other device containing a processor, memory, and an operating system. In addition, the software application of the current application can reside on either completely or partially on any one of the other elements in the system 10 depicted in FIG. 1, for example, the server 16, the database 18, the database 18, and/or the network 14. If the software application of the current application resides on a device, the application may be downloaded through a platform, such as an application store or virtual market residing on the device or accessed via the device, or may be accessed through the device's browser communicably coupled to the network 14. Further, the application of the current application can be pre-loaded on the device.

There are many types of data that can be shared, i.e. text, images, videos, photos, multimedia files, URLs/links, etc. The current application discloses examples of sharing modified data or data to be modified. A specific type of data referred to throughout this disclosure is software code data. This application will discuss software code as a practical example, however any type of data may be used for collaboration, modification and other data operational examples enclosed throughout the application.

According to example embodiments, the current application generally involves the ability to provide comments in a new and separate interface so the comments may be input via voice or text and presented to the recipient via audio or text. Notifications may be automatically presented to a user if a previously submitted comment is related to a newly added comment via a comment association procedure. Also, the ability to have access to comments in a particular scenario may be based on a user status, for example, if the user who added the comment is in the same social network as another user accessing the comment.

The current application may perform recording and storing of the various input instances including, changes, audio, video, voice recordings, links to other sources of information, etc. Such instances may make sharing of a developer's thoughts easy to obtain and easy to share with others. The user's input may include thoughts which can be depicted in a graphical user interface (GUI) displaying the code in the form of text and/or audio, etc., and which is recorded by the user. The input instance is indexed into the code such that future readers of the code may reference the developer's recorded thoughts and retain an understanding of what the developer had in mind when creating and/or modifying the code. This also obligates the developer to provide a basis for a decision to make a particular change which will be shared accordingly.

The application contains a configuration module that permits the user to configure particular elements of the application. This configuration module permits the user to specify behaviors of the application and also permits the user to predetermine specific actions. The configuration module also permits particular elements in the application to be configured by the user. The configuration module may be software residing in the client device 12, or any other element in the network architecture containing a processor and memory.

The configuration module can be implemented with programmable components in the application. Menu components can be utilized permitting for the configurable elements to be selected by the user. The configuration of the properties can be implemented by different components such as dropdown, text, textbox, checkbox, radio button, buttons and the like. For example, one element of the configuration module permits the user to specify the amount of silence that occurs before the spoken audio is captured and stored in the application. This element is presented in the GUI of the configuration module as a text entry component so the user is able to input a number. An additional drop-down component is available so the user may select "milliseconds" or "seconds".

Another portion of the configuration module permits the user to predetermine the list of keywords that are utilized to direct the application to begin recording of a comment in the application. This component may be a list of predefined keywords displayed in a drop-down menu option of the interface. Another text entry component permits the user to input specific keywords that do not reside in the predetermined list. According to the various examples, a module is a software element, such as a single file containing software code pertaining to a specific function. Therefore, each "module" would perform a specific, related number of tasks. A module ID is the identification of the module. For example, a module ID may be the file name of the module. For example, the current application may be executing and the user is viewing a software module or file containing code with the module ID=frontEndRequest.c. When right-clicking with the pointing device, a menu appears 700 including menu items. The third element, "All Authors Of Module" is selected and an event is provided that is caught by the software handling the event. This software generates a database query with parameters containing the moduleID=frontEndRequest.c, type=chat. This database query returns all chat data stored in the database with moduleID=frontEndRequest.c, or all of the chat data that occurred in the software code file=frontEndRequest.c.

The current application permits for the inclusion of user input (i.e., thoughts or comments) into the interface. The input may be provided through an interface that permits the user to speak into a microphone such that the voice is recorded and indexed in a particular location in the data, text may be entered and indexed in a particular location or any other commonly used procedure to enter data into a device. The device, for example, a desktop or laptop computer or any other named device often contains a microphone. This microphone is utilized by the application permitting the user to speak thoughts that are captured and stored. In addition, the captured data is indexed into the interface at a particular location. The data from the user is stored in the device's internal storage.

In another example, a message is sent to a remote storage device, for example, a remote server 16, a device 18, the network 14, or any other element in the system containing a processor and memory to store the data. If the storage is outside of the device 12, then messaging may occur between the remote storage device and the device 12 through the network 14. Additional messaging may be necessary to obtain the stored message when the functionality is initiated to retain the stored data.

In one example, initiating the recording process may include the user initiating the recording process by either manually initiating the recording functionality or the functionality being automatically initiated when the user speaks into the microphone. The microphone may be the standard microphone resident in the user's device 12, a headset that is connected to the device, or any other microphone utilized with the device. In this example, the user interacts with a component on the interface and the functionality to record the data is initiated. The interface component may be an icon placed on the interface such as a microphone icon. When the microphone icon is selected by the user's pointing device, functionality is executed to activate the receiving of voice from the device's microphone. The spoken voice is recorded by the audio capturing functionality and is stored in the application. For example, the user selects the microphone icon on the display to initiate the recording of the voice. The user then sets the cursor on the location to which the recorded data will be indexed.

After either a predetermined time of silence (i.e., 5 seconds) or a specific time of silence configured in the configuration module of the application, the captured data is stored in the application and indexed where the user selected. An icon is placed in the interface to indicate that data is present and is indexed at the location where the user selected. In another example, the user presses a microphone icon and continues to press the icon while speaking into the microphone. When the user releases the pressing of the icon, the recorded data is stored in the application. The user then moves the icon to where the recorded data is to be indexed and releases the icon by releasing the selected icon. The recorded data is then indexed in the location desired by the user.

In another example, the user may right-click or otherwise initiate a cursor-centric menu so the user can select a menu item entitled "Add comment". The user may then proceed to speak a comment into the device's microphone. The comment is then indexed at the location of where the user initially right-clicked as indicated by an icon on the interface. Also, the user may right-click or otherwise select a cursor-centric menu and then select a menu item entitled "Add comment". The user continues to depress the "Add comment" menu item while speaking a comment into the device's microphone. When the user releases the pointing device, the comment is indexed at the location of where the user initially right-clicked as indicated by an icon on the interface.

In another example, the user speaks into the microphone of the device and a comment is recorded and indexed where the current pointing device is located. A dictation icon is placed in the application such that the dictation icon is nearest to where the cursor was located upon initiation of the comment functionality. This either places the icon in the window displaying the image, text, media, or any other component to where the cursor was when the comment functionality was initiated.

In another example, a keyword is established either automatically or configured in the configuration module of the current application so a word or phrase is spoken and recorded and stored as the keyword. When the keyword is spoken into the device's microphone, the functionality to capture a comment is recorded and stored. An icon, for example a dictation icon, is placed in the interface on or near the location of the cursor when the comment functionality was initiated. For example, the user, through the configuration module records a keyword such as "Begin Comment". When the user is accessing an interface that is interworked with the functionality of the current application, the user may speak, "Begin Comment" followed by spoken text. The spoken text is recorded and stored and an icon is placed on the interface to indicate that a comment is available.

The recorded data is indexed such that a future consumer of the interface may obtain the data. For example, a notation is made in the interface to indicate that additional data is present. This notation may be any of text that is highlighted, a change in text type, for example, bold, a change in font, underlined, etc. A small icon is presented on the interface that, when pressed, may display the recorded data, other common features where notifications are added to components to reflect additional information present may also be incorporated into the interface. Data that is stored is interworked into the interface such that an indication is placed in the interface so the user may obtain the stored data. This indication may be in different forms, and interact in different manners depending on the type of interface.

The current application generally provides the ability to interact with comments that are placed in a new and separate interface, such as comments which were added to existing interfaces where a user interacts with different types of data. The ability to add multiple types of comments is also included in this disclosure. Also, a co-communication data event, such as text, audio, and/or video interactions, with the originator of the comment may also be performed via the collaboration application of the present disclosure. Additional co-communication embodiments permit the ability to communicate, for example, 'chat' with the originator of a comment and select a portion of the chat data to append to the comment stream as well as view a history of the previous chat sessions that have occurred related to a particular portion of the data being managed (i.e., a software coding environment). Additionally, managing of the data input comments may provide the originator of the comment to delete comments that were previously provided.

The comments are placed in a separate component of the interface and are shared with a user separately from the normal interface. As comments are normally placed in coding environments, one issue is the comments become out of 'sync' with the logic of the code. This occurs when the logic of the code is altered and the software engineer does not take the time to update the comments. Software engineers are often lacking the capacity to provide comments which are helpful to others due to their immediate concerns with fixing problems with the code and not having to explain their modifications in such live work scenarios. As a result, a developer may ignore the comments requiring them to examine the code to obtain the current logic. Thus, while comments may be an advantageous element in software development, normal lack of upkeep with the comments makes them useless.

The current application permits a separate interface providing the ability for any reader to insert comments into the interface, which are shown to the reader either automatically or via interaction with the pointing device, i.e., a click selection on a comment icon. Furthermore, it is advantageous to further the functionality of the comments by permitting the owner to delete out-of-date comments and permitting the reader to add additional comments that appear below the original comments.

In the example graphical user interface (GUI) interaction scenarios of the present disclosure, elements are discussed which perform certain actions depending on the types of input received. In these interactions, a button may be present on the interface so the user is able to interact by utilizing a pointing device, such as a mouse, stylus, a user's finger, voice or any gesture. When this occurs, the logic of the GUI performs an event dispatch. This event is dispatched in the system containing the event name and other data pertaining to the GUI element that was pressed (i.e. the button). Functions and/or procedures are included in the software that capture particular events received by the application. The architecture permits the flow of logic in the system and enables the logic that performs the requirements of the software on a system level.

In particular situations, the event that is identified and received, when a button is selected, causes a message to be sent from the client device 12 to another entity in the system. For example, the message may be sent to a remote server 16 where the messaging is routed through the network 14. In some situations, a database 18 access operation may be necessary. In those cases, the database 18 is accessed either directly through the network 14, or may be accessed via the remote server 16. A response is returned (if necessary) and the results are stored either in the remote server 16 or routed back to the client device 12 through the network 14 and stored.

When a comment is added to the interface, particular data is stored along with the comment, permitting for further interaction between the author of the comment, and future readers of the comment. This contact data may be obtained by interfacing with the personal contact information, which is stored on the user's device 12. For example, the user's email and mobile phone number may be obtained by accessing the user's data stored on the device or data stored in the cloud (i.e., 'Google' account information). This personal contact information may need to be made available by requiring the user to specifically select to share the personal information through the configuration of the personal data on the user's device 12. In another example, the author may elect to not share any or all data associated with the author's contact information. Additional components may be presented to the user that permits the restriction of contact data, for example, a checkbox component entitled "Share Contact Information".

Figure 2:
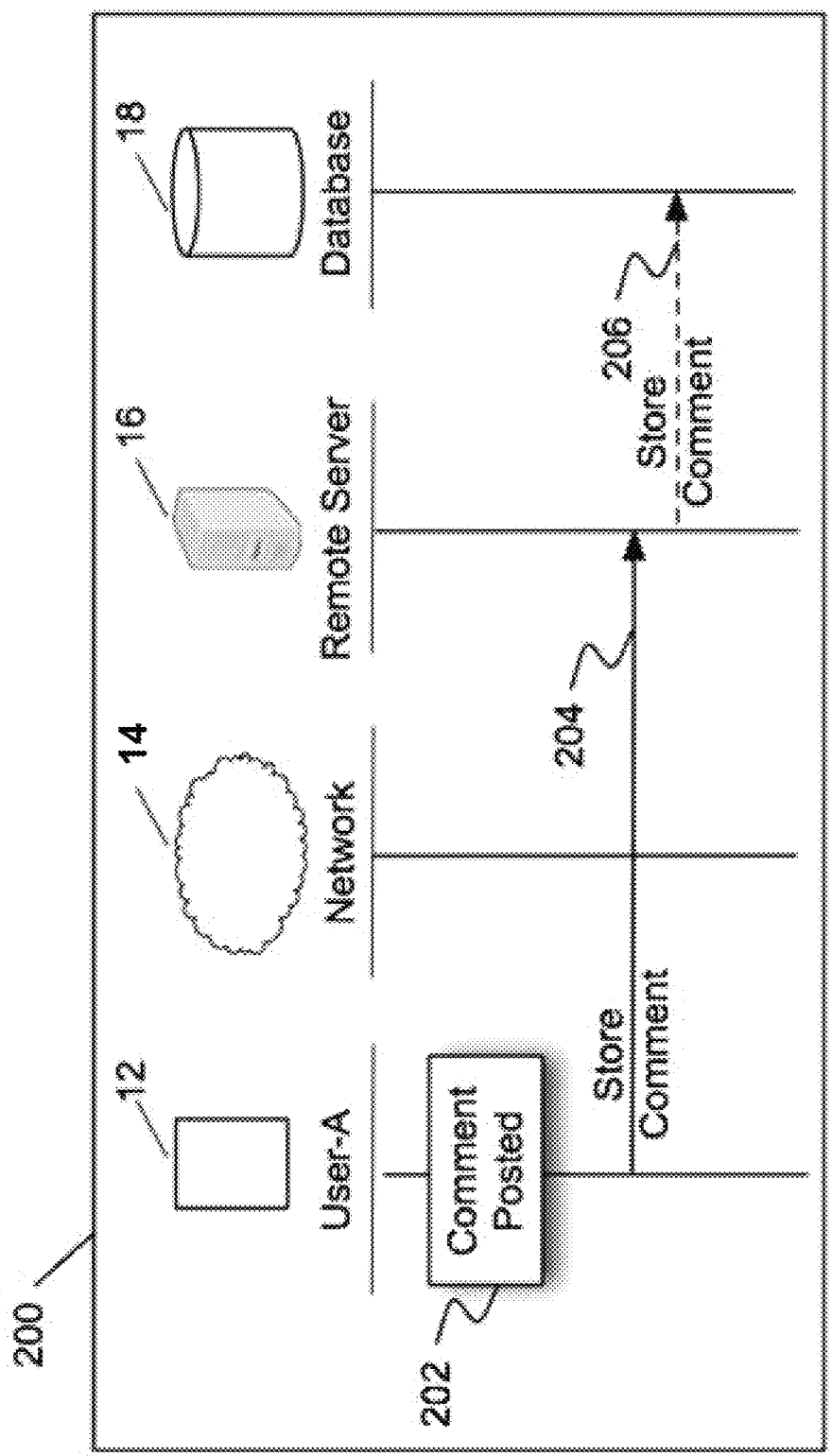
FIG. 2 illustrates a system diagram of the data interactions among the various network components according to an example embodiment of the present application.

FIG. 2 illustrates one possible implementation of the current application 200. The message flow includes the messaging that occurs when a user submits a comment onto the interface. In operation, the user posts a comment in the interface so the comment appears on the interface linked to a comment icon. A store comment message 204 is then sent to store the comment data to the remote server 16. The message is routed to the remote server 16 through the network 14. The contents of the store comment message includes: Store Comment, Message Field Name, Field Example, Author Name—Dave Hinley, Author Email—dhinley@abccorp.com, Author Phone—223-334-9593, Comment Time—0923-10232014, Comment Text—"I thought that the service was excellent, as was the pork ribs appetizer."

Figure 3:
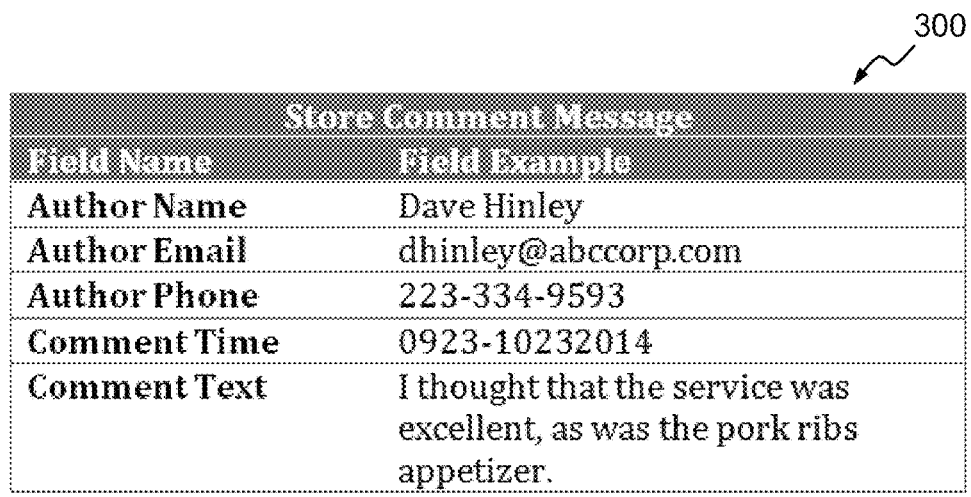
FIG. 3 illustrates a table of comment attributes and metadata among input data received and categorized according to an example embodiment of the present application.

The table 300 of FIG. 3 illustrates one implementation of the contents of the store comment message. The author's information, such as name, email, phone, and other similar or dissimilar information, is obtained through various profile updates received by the application. The contact data is obtained to permit the reader of the message to establish communication with the author of the comment via various mediums, for example email, text/chatting, and other similar or dissimilar communication paths. The comment time and text is also included in the message permitting the text in the comment to be displayed as well as the time that the comment was posted. The data in the store comment message may be stored internal to the remote server 16, or may be stored in the remote database 18 so the store message 206 command is sent to a database 18.

Figure 4:
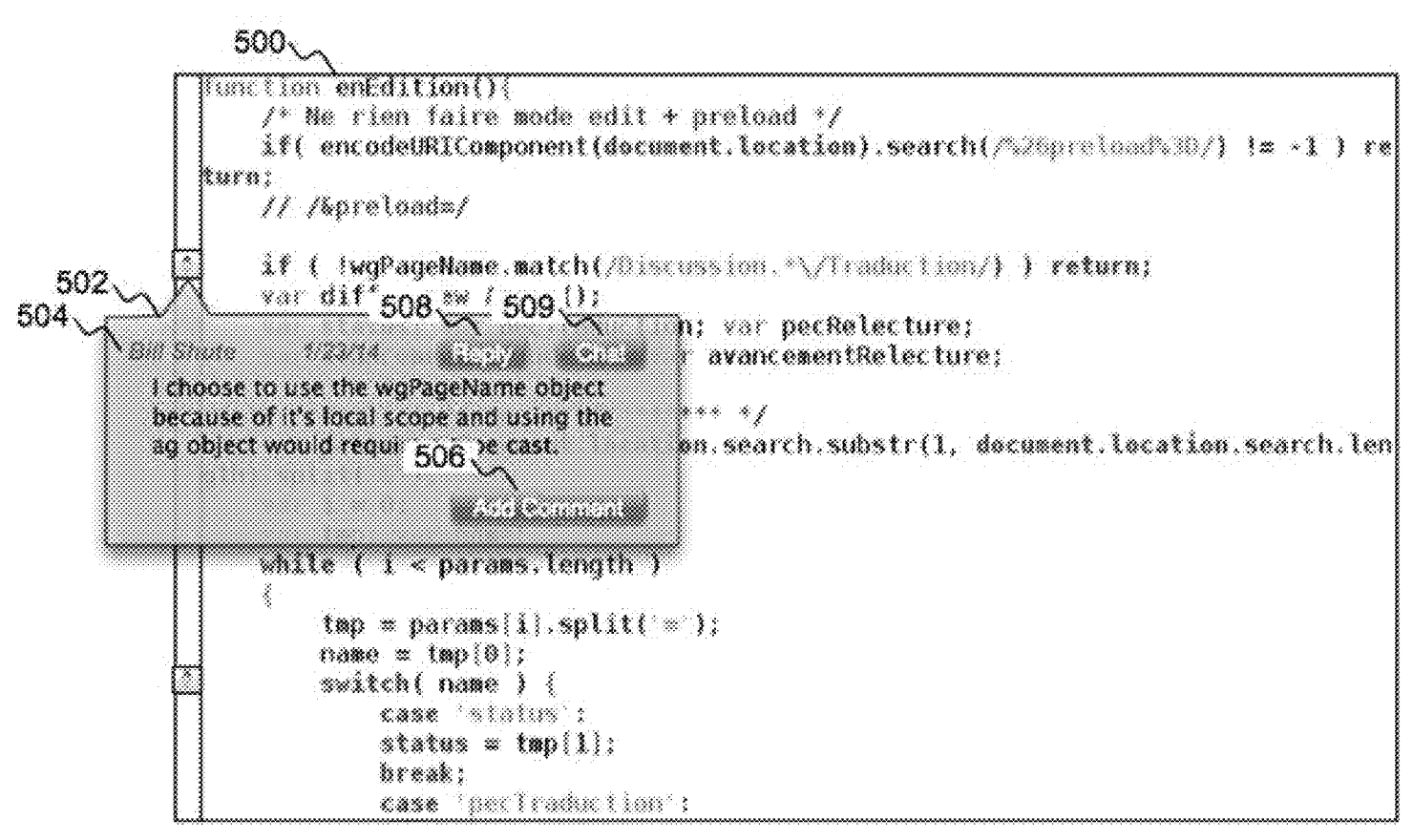

FIG. 4 illustrates an example of interfacing with comments. Referring to FIG. 4, one possible implementation of the current application 500 is provided. The current comment 502 is displayed pertaining to an icon. The comment may be shown after the user interfaces with the icon, for example, clicking on the icon with a pointing device. The comment includes the author and the date of the comment 504. This information is obtained from the information of the user via a profile invocation operation that loads profile information of the user into the current data instance post performed by the user.

In another example, the user's name is selectable to automatically open a messaging application (i.e., an email application, a messaging/chat application, etc.). In yet another example, there exists a title component following the commenter's name. For example "Developer" or "Software Manager". This provides additional insight as to the commenter. In yet another example, an icon is disposed next to the commenter's name which, when clicked, opens an organization chart in a new, separate window depicting the chart of the commenter. The data for the organization chart is obtained either directly or through application program interfaces (APIs) with the organizations organization chart software, or through the accessible human resource data.

There are components on the bottom of the comment window 502 permitting the user to further interface with the comments. For example, an "Add Comment" button 506 permits the user to add to the comments by opening a comment text entry component. The comment is added below at the bottom of the comment list. A "Reply" button 508 permits the user to send a direct message to the originator of the comment in a private scenario. The message in a reply is not recorded in the comment window. This permits the user to interface privately with the originator of the comment. The functionality associated with the event that occurs when the button is selected, opens another window so the user is able to type a message.

In another example, the user's native email application is executed so the recipient is automatically populated with the email address of the comment's originator obtained from the software. Also, the subject of the email is automatically populated to reflect the details of the comment. For example, the module name, line number, etc., of the comment is populated as the subject. Such information assists the recipient in understanding the context of the email message.

In another example, the text of the comment is automatically populated in the body of the email to help the recipient understand quickly the context of the email. In yet another example, the line number associated with the comment is included in the subject of the email. For instance, X number of lines above the line associated with the comment and Y number of lines below the line associated with the comment are included in the body of the email. This offers the email recipient more context of the input data.

A "Chat" button 509 opens a chatting application with the originator of the comment. This permits the user to interface with the originator of the comment in a private scenario. Upon pressing the "Chat" button, the chat application opens (if available) which permits the current user to chat with the author of the respective user. The current owner of the data, for example, the owner of the software is used for interaction (i.e. email, messaging, chatting, etc.). In another example, the buttons 506, 508 and 509 are present at the bottom area of each comment in the scenario when there are multiple comments listed in the comment window.

Figure 5:
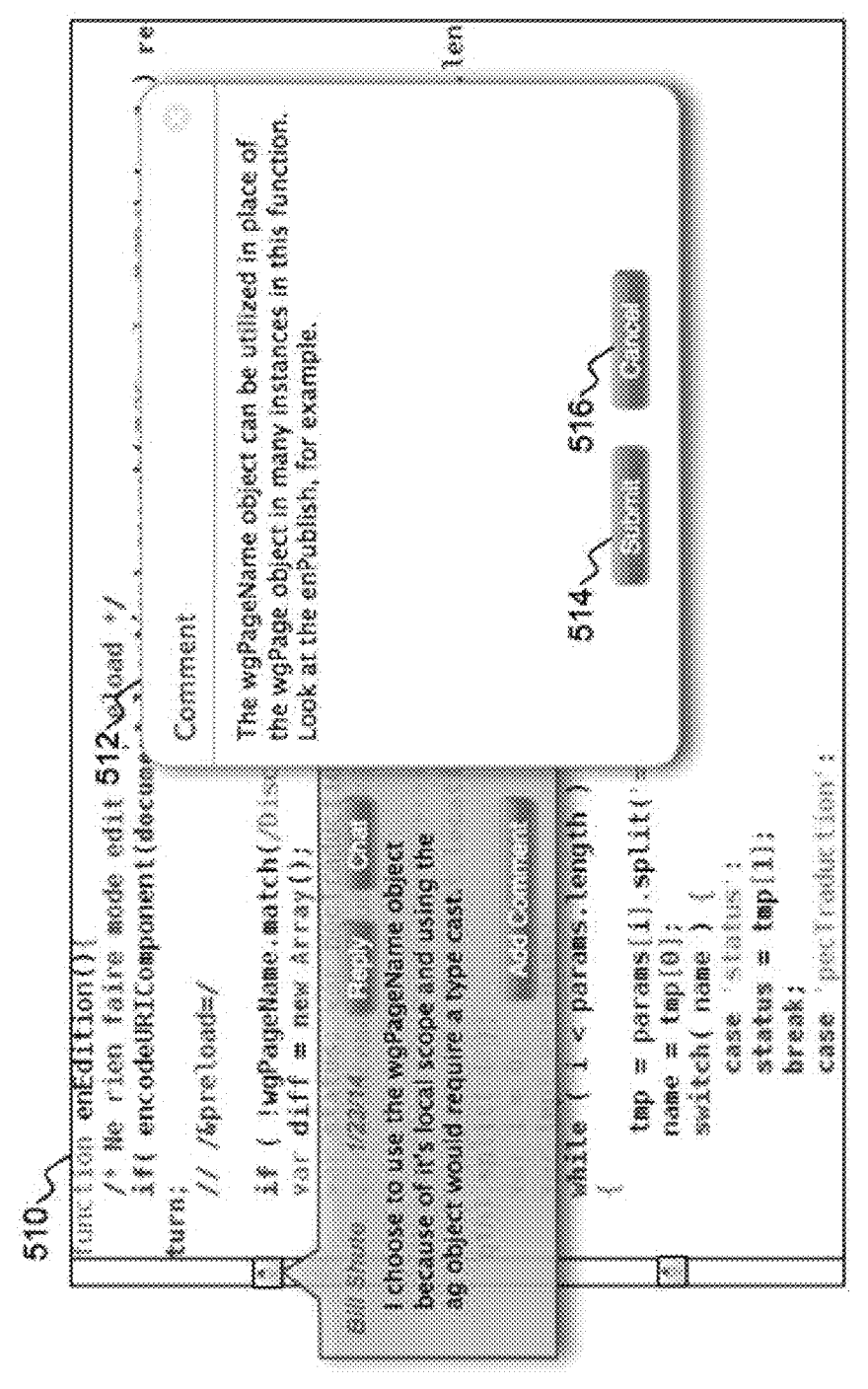

FIG. 5 illustrates one possible implementation of the current application 510. In this scenario, the user has pressed the "Comment" button 506. A separate comment window appears 512 permitting the user to add a comment. Text is entered into the comment window thereafter. The user may press the "Submit" button 514 to submit the comment wherein the additional comment appears at the bottom of the original comment window 502. The user selects the "Cancel" button 516 to dismiss the comment window and no further action is taken.

Figure 6:
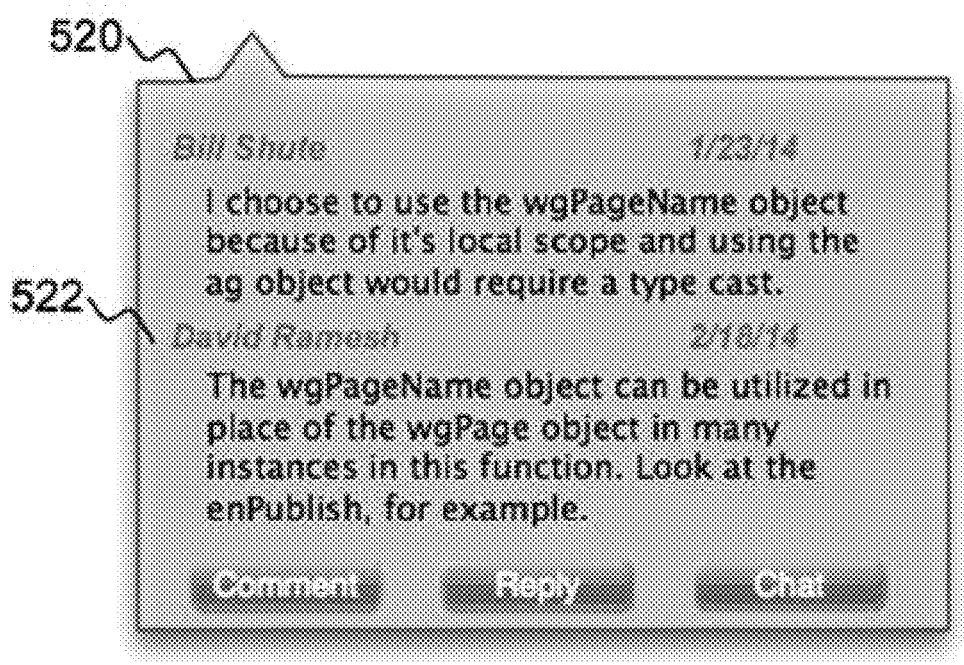
FIG. 6 illustrates a multiple comment sharing and collaboration user application interface according to an example embodiment of the present application.

This example illustrates one possible implementation of the current application. Referring to FIG. 6, in this interface 520, multiple comments are displayed 522 and each comment contains the author of the comment following the date that the comment was submitted. Each comment lists the author and the date. Two buttons "Reply" and "Chat" permit for further interaction with the author. The "Reply" permits the user to send a message, for example, an email message to the author of the comment.

In another example, if the author is not reachable, for example, the author has since left the organization and his or her email, telephone number, etc., is not available for contact purposes, the message is automatically forwarded to the owner of the data presented in the interface. A "Chat" button opens an instant messaging application, for example, a chatting application with the author of the comment. If the author is not available the chatting application instead establishes a chat with the owner of the data presented in the interface. An "Add Comment" button permits a user to add data to the comments by submitting an additional comment. This implementation permits a current interface to be enhanced with editable comments and also permits for the reader of the comments to make comments, and provide additional input.

Figure 7:
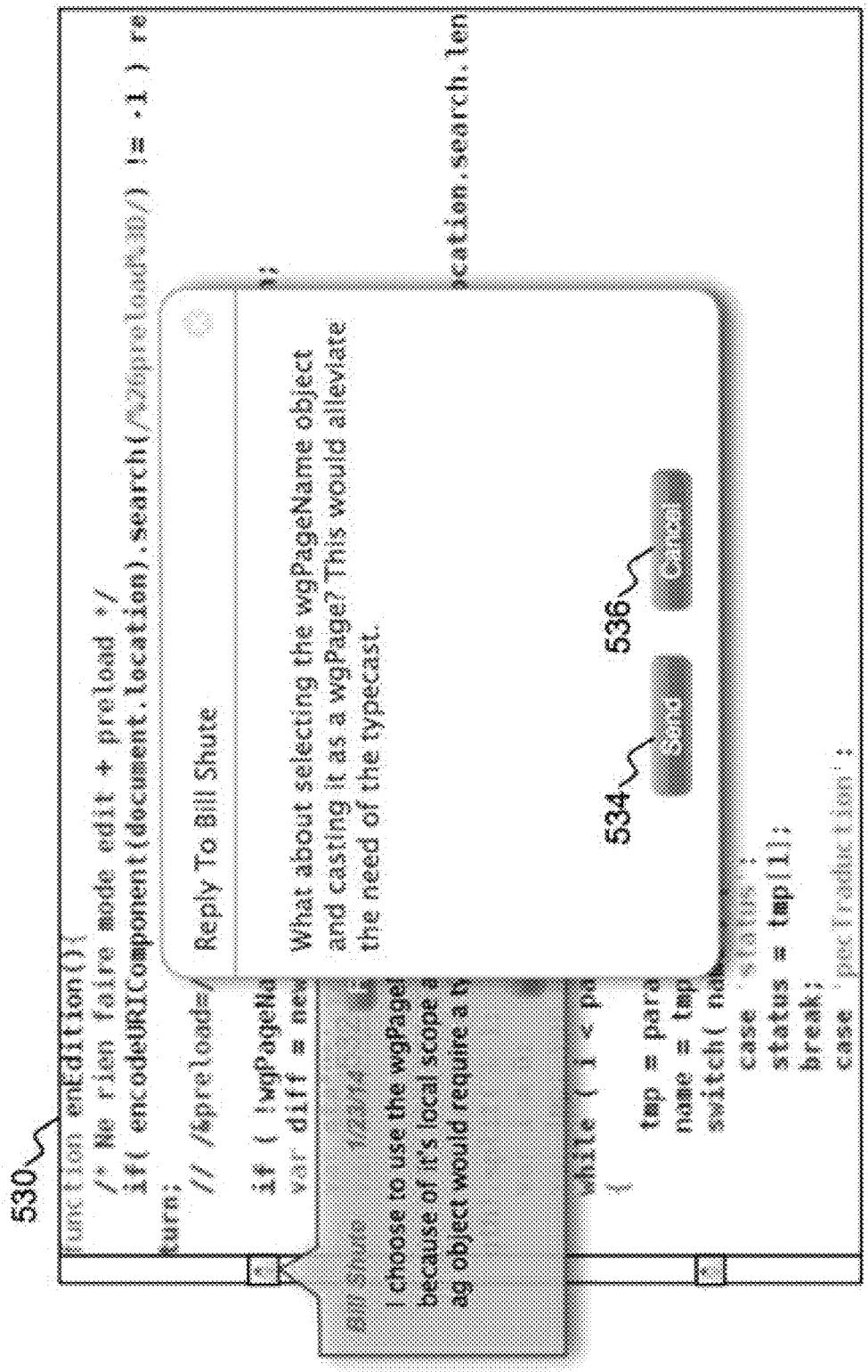
FIG. 7 illustrates a comment sharing and reply example of the collaboration user application interface according to an example embodiment of the present application.

FIG. 7 illustrates a GUI image of one possible implementation of the current application 530. A window is illustrated 532 as being displayed after the user selects the "Reply" button 508. A reply to a comment is utilized to directly message (i.e., email) the author of the comment. In another example, a copy of the email is sent to the sender's address. This permits the record of the sent email, as well as permitting the sender to respond with further messaging in the normal email client application.

The user may select the "Send" button 534 to submit the message to the author of the comment. The user can also select the "Cancel" button 536 to dismiss the reply window and no further action is taken. The current user may establish a text message session with the author of the previously submitted comment. For example, the user may select the "Chat" button 509 so a chat session is initiated between the user and the author of the comment, in this example 'Bill Shute' 504.

Figure 8:
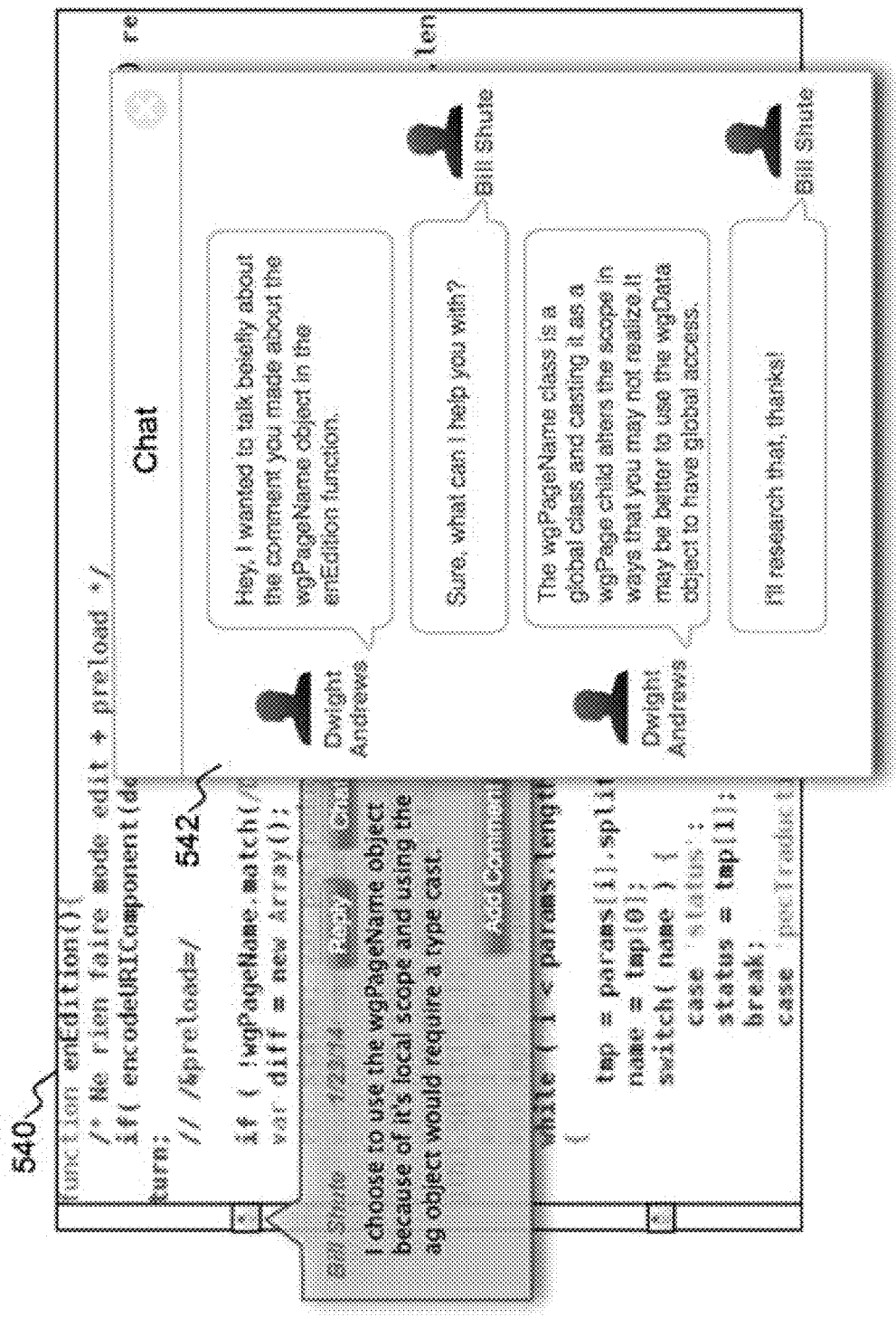
FIG. 8 illustrates a comment sharing and chat example of the collaboration user application interface according to an example embodiment of the present application.

FIG. 8 illustrates a GUI image of one possible implementation of the current application 540. The example illustrates a chat window 542 that is presented upon the user pressing the "Chat" button 509. The application obtains the author's contact information from either the local data of the application, or alternatively, from communicating with the remote server 16, the database 18, the network 14, or any other element in the system containing a processor and memory. In this example, the author of the comment, 'Bill Shute', is notified of a chat request from the user, 'Dwight Andrews'. As depicted, a conversation is presented between the two users. Additional functionality is available so any user is able to interact with the chat messages such that the chat text can be automatically ported as a submitted comment.

Figure 9:
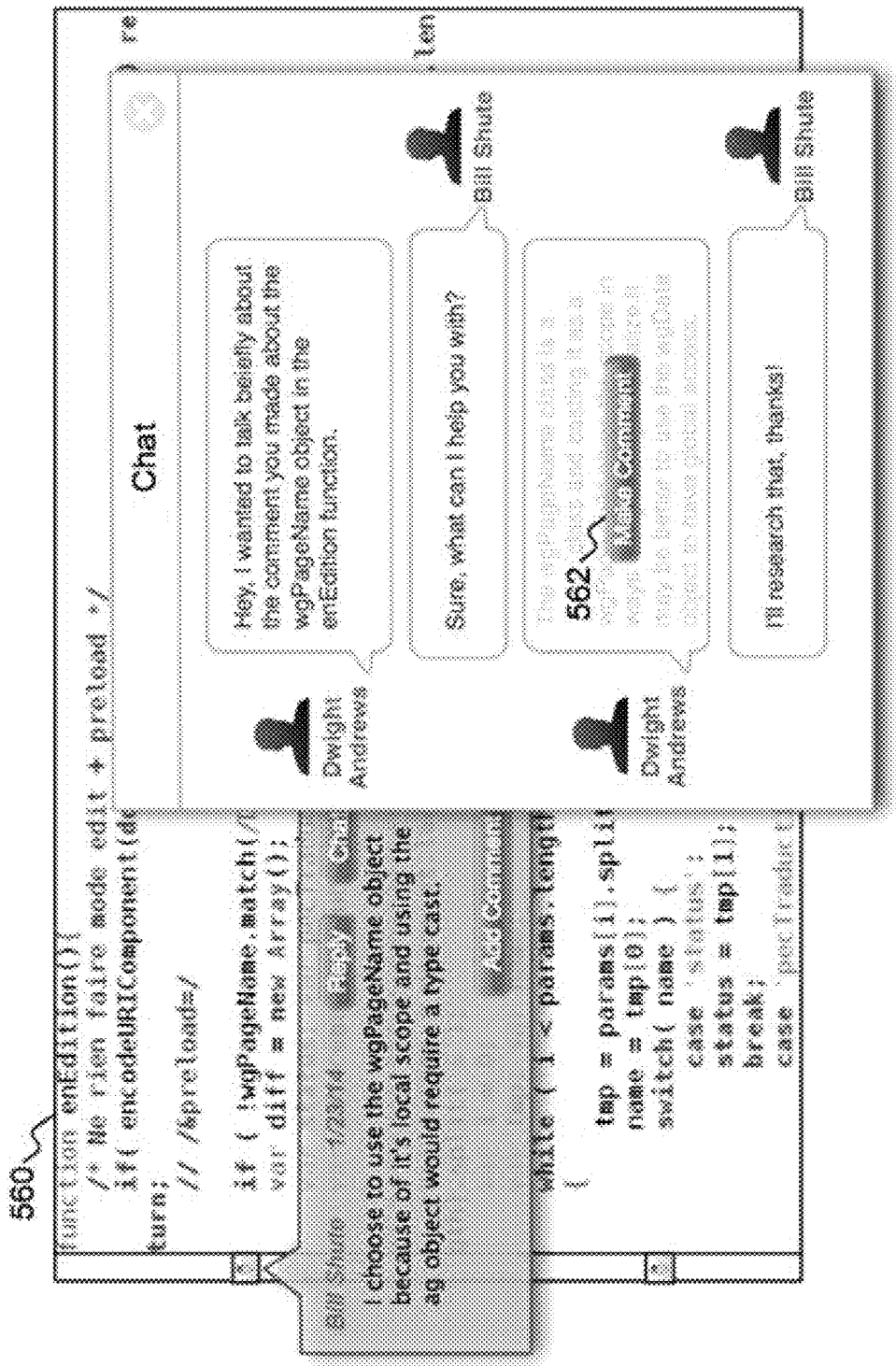
FIG. 9 illustrates a chat to comment conversion of the collaboration user application interface according to an example embodiment of the present application.

FIG. 9 illustrates a GUI image of one possible implementation of the current application 560. Referring to FIG. 9, the chat window has an additional "Make Comment" button 562 overlaid on a particular chat text portion. This button is displayable through clicking on the chat text. When the button is pressed, the text is automatically placed into the comment stream. In another example, the "Make Comment" button 562 is displayed when the user moves the pointing device over each of the chat text sessions. Also, when the user clicks on a chat text portion, the chat window may rotate in a circular fashion and the "Make Comment" button is then displayed. Next, the user may click again outside the button area and the chat window rotates again displaying the chat text.

In other examples, other buttons are displayed when the user interacts with the chat window. These buttons may permit functionality such as adding another user to the session thus permitting a multi-party chat session, emailing a party on the chat session, contacting (via email/chat or any other communication procedure) the owner of the data where the comment was originally located, or any other similar or dissimilar functionality. The user may convert a chat text that has been submitted by the same user. The user may be restructured from converting a chat text from another user. The functionality that displays the "Make Comment" button is not presented to the user for chat texts areas that have been submitted by another user. Additionally, the owner of the data where the original comment was posted may convert any portion of the chat text to a comment. In such a case, the author comment becomes the author of the comment and the contact details for that author are correlated to the comment.

FIG. 10 illustrates a GUI image of one possible implementation of the current application 570. Referring to FIG. 10, the comment stream 572 has been updated with the chat text that was since converted to a comment 562. The author of the comment 574 is the user that wrote the chat text that was converted. The other details, for example, the contact details of the author may be stored along with the comment.

As time passes and comments are present in the interface, the data in the interface may be altered so the comments become out-of-date or unrelated to the current data in the interface (i.e. comments which are included in software code interfaces). In such a scenario, it becomes necessary for the software to permit the deletion of included comments. In this example, the owner of the data in the interface is provided additional GUI components permitting for the editing of the comments.

When a comment is presented on the interface, permissions are validated to determine the user of the current interface. This is performed by comparing the current user with the owner of the data in the interface. For example, if the interface is a software development interface, the current owner of the software module where the comment is applied is permitted to edit the comments in the module. For interfaces when a current owner is not known (i.e. a map interface), the comment is deleted by only the author of the comment.

Figure 11:
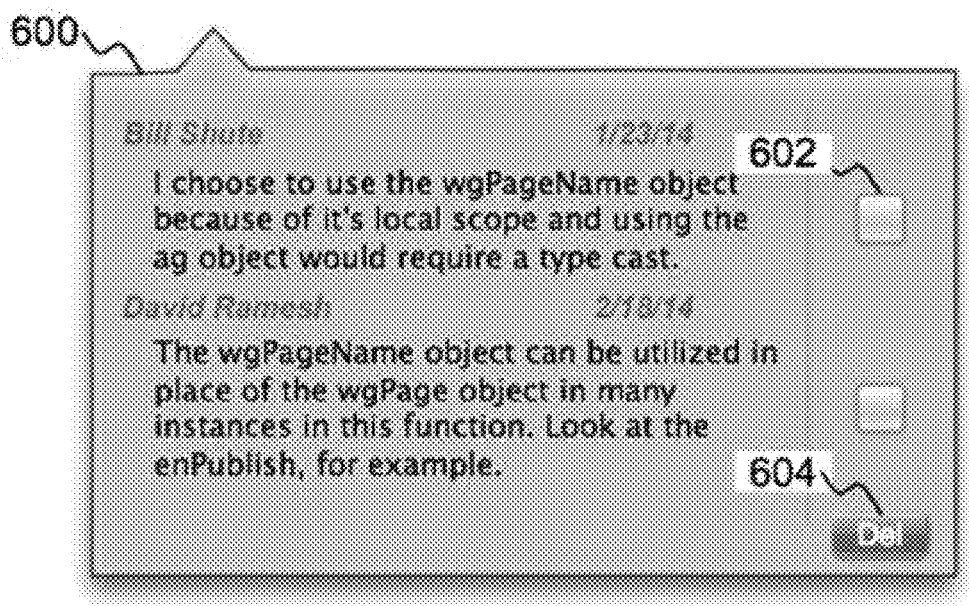
FIG. 11 illustrates a comment editing update interface according to an example embodiment of the present application.

FIG. 11 illustrates a GUI image of one possible implementation of the current application 600. The software permits the editing of the comments so the user is able to select particular comments and delete them as desired. The editing functionality is obtained from the software so the user is able to select and edit particular comments. This may be through a component on the interface, such as an "Edit" button where all comments on the currently displayed data may be edited. In another example, the user may select a comment to edit by entering edit mode. The comments window is altered upon entering the editing mode. As such, the window is expanded to include additional components permitting editing capabilities. For example, checkboxes are displayed corresponding to each comment in the comment window 602. The component may be a checkbox or any other component permitting for a selection of comments. The comments are selected by the user through the clicking of each of the selection components 602 and multiple comments may be selected.

A "DEL" component, for example a button component exists to initialize the delete functionality 604. An event may be submitted where all previously selected comments are removed from the storage of the comments. The comment window 540 is redrawn so that a new query can be made to obtain all of the comments for that instance. In another example, a verification window is displayed to obtain validation prior to the deletion of the comment(s).

In another example, the owner of the comment is only able to delete that comment. When displaying the comments, if the current user is the owner of any comment, additional GUI elements are available permitting for further interaction with the comment(s) owned by the same user. For example, a "Delete" button is presented in the same or a similar area as the comment. When the "Delete" button is selected the comment is removed.

In another example, the functionality is also included that permits the user to view the communication, such as chat/IM, text, voice, video, etc., history for a comment. The user is able to view previous communication all communications for the author of a particular comment, all communications for all authors of all comments in the comment stream, all communications for all commenters in the current data (i.e. the current module). The view communication history functionality is considered a secondary interaction. For example, secondary interactions are implemented through a particular pointing device, for example a "right-click" of the mouse. In a right-click, the user would click on the right button on the mouse, or in the case of particular track pads, a click with two fingers. This mouse peripheral click scenario is normally used in applications and the user would usually expect secondary menu items to be displayed upon performing a right-click of the mouse.

Additionally, the software is cognizant of the location of the mouse when a click, or right-click is performed. This permits the user to click or right-click on particular elements of the GUI wherein the functionality of the click pertains to the location of where the mouse is at that time. For example, if the user was viewing the comment stream 502 and were to right-click on 522, the software would display a secondary menu. This secondary menu would include the chat history menu item. Additional menu items are also present permitting the user to select the chat histories of other elements as further depicted below.

Figure 12:
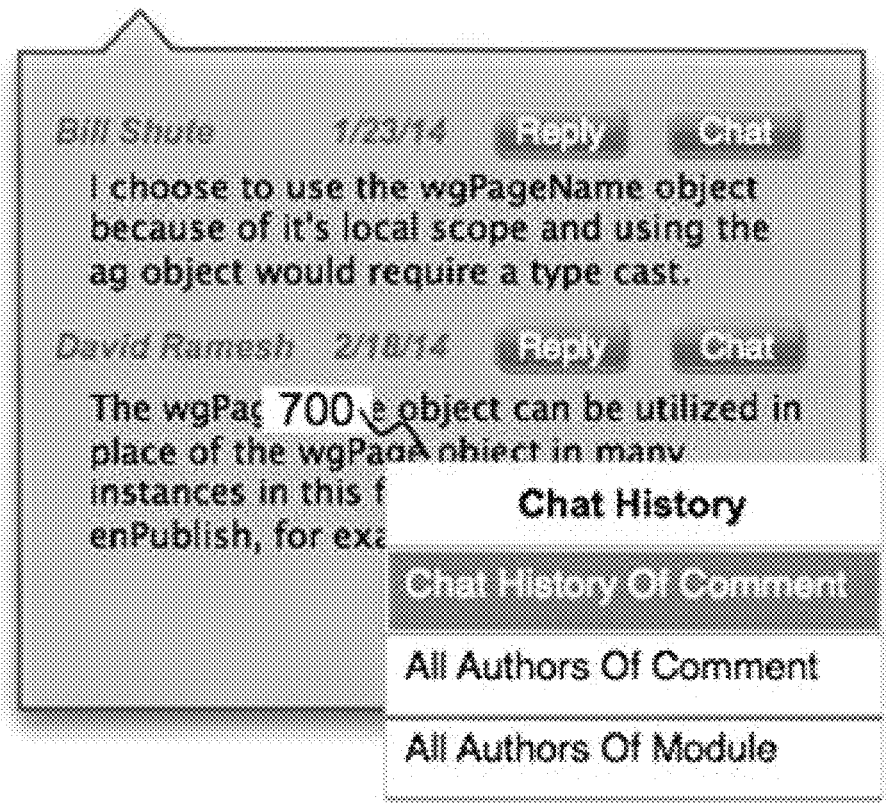
FIG. 12 illustrates a chat history interface according to an example embodiment of the present application.

FIG. 12 illustrates a GUI image of one possible implementation of the current application 700. The comment window is illustrated and it is understood that the comments are related to data in the interface. In this example, the user has hovered over the second comment in the comment stream and provided input to permit a secondary menu. This may be accomplished by issuing a command via an input device, such as a "right-click" with the mouse.

An event is received upon the right-click that is caught by a function in the software that permits the GUI to display a secondary menu list 700. This menu list permits the user to view previous chat histories related to the comment at the mouse pointer location when the right-click was performed. There are three items listed in the secondary menu in this example. The default selected item is the first menu item and is entitled "Chat History Of Comment". This retrieves a list of the chat history for the author of the current comment. In this example, the current author is 'David Ramesh'. An event is received upon the selection of this item that includes a request to obtain previous chats that are stored by the author and related to the current comment. A database retrieval operation is then made that retrieves the chats. Functionally, when the event is issued, is intercepts by a function that intercepts the event and performs a database query. This database may be locally located at the client device 12, and/or the database 18 may be remotely located so messaging may occur through the network 14 and optionally accessed through the remote server 16. A return message is sent in response to the database query so the function then creates a GUI window that contains a history of the chats for the menu item selected.

The database query sends parameters that direct the database to form a query to obtain the needed information. For example, the parameters include the user's information (i.e. the user ID, email address, or any other similar information), the ID of the comment, and an element directing the database as to the type of information desired, in this example "chat". A second option that the user may select is entitled "All Authors Of Comment". The functionality is similar to the first selection with the exception of a slightly different database query. In this database query, the parameters include the comment ID referring to the current comment, and an element directing the database as to the type of information desired, in this example "chat". This will return all chats pertaining to the current comment.

A second option that the user may select is entitled "All Authors Of Module". The functionality is similar to the second selection with the exception of a different database query. In this database query, the parameters include the module ID referring to the current module, and an element directing the database as to the type of information desired, in this example "chat", which will return all chats pertaining to the current module. The term "All Authors Of Module" represents all of the people that have altered the module, or software file. In a software environment, different people may modify the software and the software environment tracks the changes made by each person. This selection returns all of the people that have contributed changes to the software, or module. Another, more identifiable menu item may be: "All Contributors Of Module" such that the people who modify the software file (or module) are not really authors, but are considered contributors.

In another example, the chat history is accessible through a button placed on the comment window via a "Chat History" button on the bottom of the comment window. To view other options, a dropdown component is made available where the user is able to select which chat history is desired.

Figure 13:
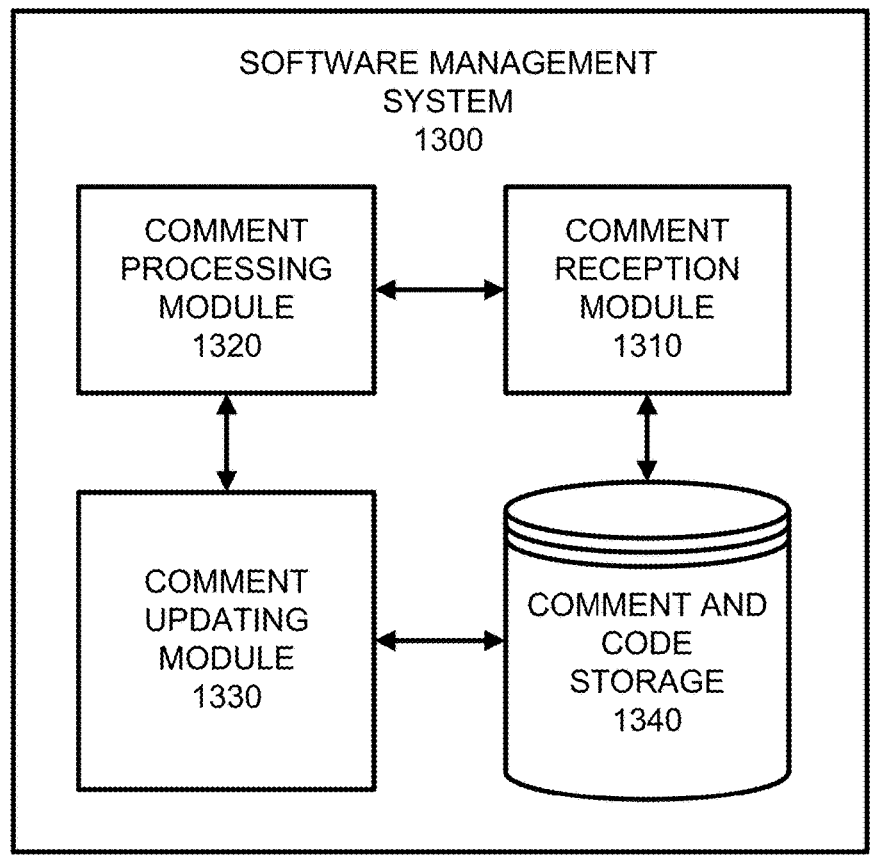
FIG. 13 illustrates a system configuration configured to perform one or more of the example embodiments of the present application.

FIG. 13 illustrates a software management system 1300 according to example embodiments. Referring to FIG. 13, the system 1300 may represent a standalone computer, a group of computers on a network, in the cloud or in communication via any medium known to one skilled in the art which operate to perform the various operations, procedures, methods and related functions of the present application and the software application described throughout the disclosure. Referring to FIG. 13, the comment reception module 1310 may be a transmitter/receiver that receives comments to code and stores the comments in memory 1340 and forwards the comments for processing 1320. The updated content may be identified and stored in memory via the comment update module 1330.

One example method of operation may include the system 1300 receiving and processing a comment associated with a first user profile via the comment reception module 1310, identifying a context of the comment and identifying at least one previously submitted comment with a context that matches the context of the comment via the comment processing module 1320. The method may also include retrieving the previously submitted comment and identifying a second user profile associated with the previously submitted comment and also invoking a communication session and including the first user profile and the second use profile in the communication session. The changes may be stored in the comment storage 1340 and updated via the comment update module 1330. In one example, the identifying of the context of the comment includes identifying a present type of code error and automatically populating a communication session interface of the communication session with a software object link based on the context of the comment. When identifying a previously submitted comment with a context that matches the context of the comment, the method may also identify a user profile credited with having corrected an error related to the context of the comment. The communication session may include a chat session between the first user profile and the second use profile. A first invite message may then be transmitted to a first user device associated with the first user profile inviting the first user device to the chat session, and a second invite message can be transmitted to a second user device associated with the second user profile inviting the second user device to the chat session. A portion of the comment including the context of the comment can then be selected and a notification including the selected portion of the comment can be created and sent to another user or second user device.

In another example method of operation, system 1300 may include receiving and processing a comment associated with a first user profile, identifying a software code context of the comment based on a software code data file and identifying a plurality of other user profiles associated with the software code context of the comment. Request messages can then be sent to the plurality of other user profiles to provide feedback regarding the software code context of the comment and a plurality of comment metadata fields are also retrieved. The method also include the processing module 1320 pairing the plurality of comment metadata fields with the comment, and creating the request messages including the comment and the plurality of comment metadata fields and updating the status via the update module 1330.

The plurality of comment metadata fields include at least one of the author name, the author email, the author phone number, a comment time and a comment text. The comment includes at least one variable that is part of the software code context of the comment. Then, at least a portion of the comment is saved with the software code data file based on the context of the comment. The context of the comment includes at least one software object identified in the comment. The method also includes identifying a question and answer portion of a chat session related to the comment, and selecting a portion of the question and answer portion of the chat session to be saved with the software code data file.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 14 illustrates an example network element 1400, which may represent any of the above-described network components, etc.

Figure 14:
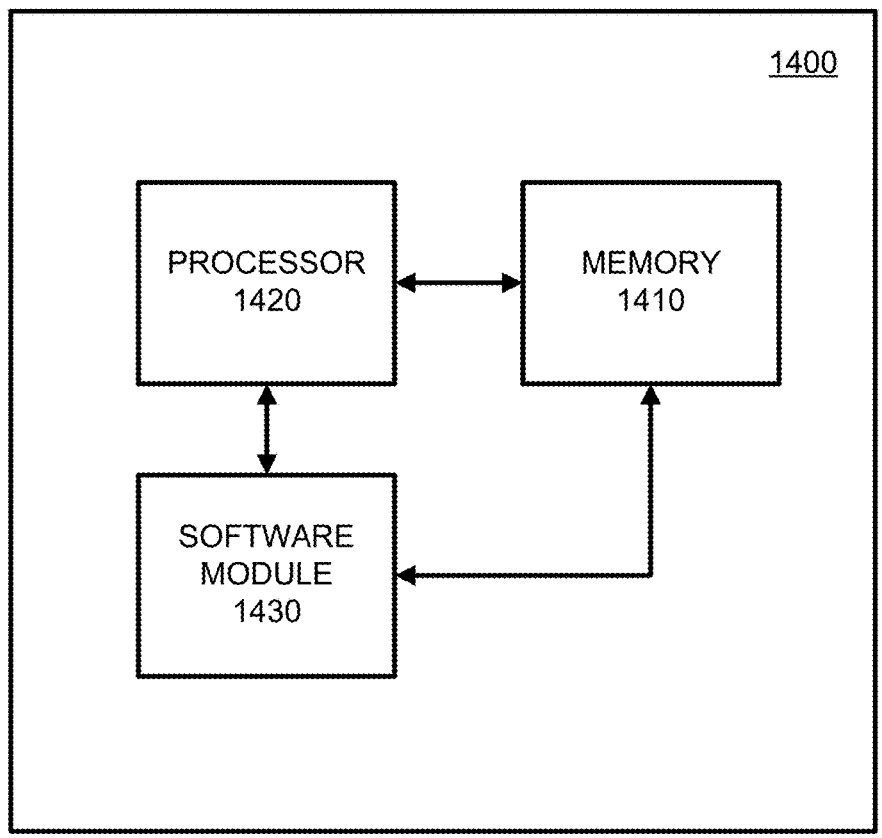
FIG. 14 illustrates an example network entity device configured to store instructions, software, and corresponding hardware for executing the same, according to example embodiments of the present application.

As illustrated in FIG. 14, a memory 1410 and a processor 1420 may be discrete components of the network entity 1400 that are used to execute an application or set of operations. The application may be coded in software in a computer language understood by the processor 1420, and stored in a computer readable medium, such as, the memory 1410. The computer readable medium may be a non-transitory computer readable medium that includes tangible hardware components in addition to software stored in memory. Furthermore, a software module 1430 may be another discrete entity that is part of the network entity 1400, and which contains software instructions that may be executed by the processor 1420. In addition to the above noted components of the network entity 1400, the network entity 1400 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 12 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computer-implemented method comprising a processor executing a plurality of steps including:
    recording a first required comment when a first user makes a change to a software code data file, wherein the recorded first comment includes at least one of audio input, video input, text input, and a link to a source of information other than the software code data file;
    indexing the first comment into the changed code for future reference;
    automatically associating the recorded first comment with a user profile of the first user;
    depicting to a second user, in a graphical user interface (GUI), the changed software code and an indicator to the left of and adjacent to the changed software code in a column dedicated to displaying comment indicators, signifying that at least the recorded first comment indexed into the changed code is available for review;
    responsive to an interaction of the second user with the indicator, depicting the first comment in the GUI in a comment box with at least three different graphical elements that initiate a different respective function when selected, including:
        a Reply graphical element that initiates sending an email or text message to the first user;
        a Chat graphical element that initiates a chat session with the first user; and
        an Add Comment graphical element that initiates recording a new comment to be appended to the existing comment;
    in the case the second user selects the Add Comment graphical element, recording a second comment and appending it to the first comment as a comment stream;
    requiring the recording the second comment in the case the second user makes a change to the software code data file;
    in the case the second user selects the Reply graphical element, invoking a communication application automatically configured to send a message to the first user; and
    in the case the user selects the Chat graphical element, automatically invoking a chat session with the first user.

2. The method of claim 1, further comprising:
    identifying a software code context of the comment stream based on the software code data file;
    identifying a plurality of other users associated with the software code context of the comment stream;
    creating request messages comprising the comment stream, automatically addressed to the plurality of other users associated with the software code context of the comment stream; and
    transmitting the request messages to the plurality of other users to provide feedback regarding the software code context of the comment stream.

3. The method of claim 2, further comprising retrieving information of respective ones of the plurality of other users associated with the software code context of the comment stream, including at least their name, email address, and phone number.

4. The method of claim 3, wherein the comment stream comprises at least one variable that is part of the software code context of the comment stream.

5. The method of claim 4, further comprising:
    automatically saving at least a portion of the comment stream with the software code data file based on the context of the comment stream.

6. The method of claim 5, wherein the context of the comment stream comprises at least one software object identified in the comment stream.

7. The method of claim 1, further comprising:
    appending a selected portion of the chat session to the comment stream.

8. An apparatus comprising:
    a receiver configured to receive a comment associated with a user profile;
    a processor configured to:
        record a first required comment from a first user when changing a software code data file, wherein the recorded first comment includes at least one of audio input, video input, text input, and a link to a source of information other than the software code data file;
        index the recorded first comment into the changed code for future reference;
        automatically associate the recorded first comment with a user profile of the first user;
        depict to a second user, in a graphical user interface (GUI), the changed software code and an indicator to the left of and adjacent to the changed software code in a column dedicated to displaying comment indicators, signifying that at least the recorded first comment indexed into the changed code is available for review;
        responsive to an interaction of the second user with the indicator, depict the first comment in the GUI in a comment box with at least three different graphical elements that initiate a different respective function when selected, including:
            a Reply graphical element that initiates sending an email or text message to the first user;
            a Chat graphical element that initiates a chat session with the first user; and an Add Comment graphical element that initiates recording a new comment to be appended to the existing comment;

in the case the second user selects the Add Comment graphical element, recording a second comment and appending it to the first comment as a comment stream;

requiring the recording the second comment in the case the second user makes a change to the software code data file;

in the case the second user selects the Reply graphical element, invoking a communication application automatically configured to send a message to the first user; and in the case the user selects the Chat graphical element, automatically invoking a chat session with the first user.

9. The apparatus of claim 8, wherein the processor is further configured to:

retrieve information of respective ones of the plurality of other users associated with the software code context of the comment stream, including at least their name, email address, and phone number;

create request messages comprising the comment stream, automatically addressed to the plurality of other users associated with the software code context of the comment stream; and transmit the request messages to the plurality of other users to provide feedback regarding the software code context of the comment stream.

10. The apparatus of claim 9, wherein the processor is further configured to:

retrieve information of respective ones of the plurality of other users associated with the software code context of the comment stream, including at least their name, email address, and phone number.

11. The apparatus of claim 10, wherein the comment stream comprises at least one variable that is part of the software code context of the comment stream.

12. The apparatus of claim 11, wherein the processor is further configured to automatically save at least a portion of the comment stream with the software code data file based on the context of the comment stream.

13. The apparatus of claim 12, wherein the context of the comment stream comprises at least one software object identified in the comment stream.

14. The apparatus of claim 8, wherein the processor is further configured to append a selected portion of the chat session to the comment stream.

15. A non-transitory computer readable storage medium configured to store instructions that when executed cause a processor to perform:

recording a first required comment when a first user makes a change to a software code data file, wherein the recorded first comment includes at least one of audio input, video input, text input, and a link to a source of information other than the software code data file;

indexing the first comment into the changed code for future reference;

automatically associating the recorded first comment with a user profile of the first user;

depicting to a second user, in a graphical user interface (GUI), the changed software code and an indicator to the left of and adjacent to the changed software code in a column dedicated to displaying comment indicators, signifying that at least the recorded first comment indexed into the changed code is available for review;

responsive to an interaction of the second user with the indicator, depicting the first comment in the GUI in a comment box with at least three different graphical elements that initiate a different respective function when selected, including:

a Reply graphical element that initiates sending an email or text message to the first user;

a Chat graphical element that initiates a chat session with the first user; and an Add Comment graphical element that initiates recording a new comment to be appended to the existing comment;

in the case the second user selects the Add Comment graphical element, recording a second comment and appending it to the first comment as a comment stream;

requiring the recording the second comment in the case the second user makes a change to the software code data file;

in the case the second user selects the Reply graphical element, invoking a communication application automatically configured to send a message to the first user; and in the case the user selects the Chat graphical element, automatically invoking a chat session with the first user.

16. The non-transitory computer readable storage medium of claim 15, wherein the processor is further configured to perform:

identifying a software code context of the comment stream based on the software code data file;

identifying a plurality of other users associated with the software code context of the comment stream;

creating request messages comprising the comment stream, automatically addressed to the plurality of other users associated with the software code context of the comment stream; and transmitting the request messages to the plurality of other users to provide feedback regarding the software code context of the comment stream.

17. The non-transitory computer readable storage medium of claim 16, wherein the processor is further configured to perform retrieving information of respective ones of the plurality of other users associated with the software code context of the comment stream, including at least their name, email address, and phone number.

18. The non-transitory computer readable storage medium of claim 17, wherein the comment stream comprises at least one variable that is part of the software code context of the comment stream.

19. The non-transitory computer readable storage medium of claim 18, wherein the processor is further configured to perform:

automatically saving at least a portion of the comment stream with the software code data file based on the context of the comment stream.

20. The non-transitory computer readable storage medium of claim 19, wherein the context of the comment stream comprises at least one software object identified in the comment stream and the processor is further configured to perform:

appending a selected portion of the chat session to the comment stream.

* * * * *